(12) United States Patent
Lin et al.

(10) Patent No.: US 7,645,973 B2
(45) Date of Patent: Jan. 12, 2010

(54) SUN-TRACKING POWER GENERATING APPARATUS

(76) Inventors: Chien-Feng Lin, No. 14, Lane 9, Ankang Street, Hsinchu City (TW); Chuan-Yi Lin, No. 35, Jhongfu Rd., North District, Hsinchu City (TW); Cheng-Min Chen, 8F., No. 37, Guangming 6th Rd., Jhubei City, Hsinchu County (TW)

( * ) Notice: Subject to any disclaimer, the term of this patent is extended or adjusted under 35 U.S.C. 154(b) by 211 days.

(21) Appl. No.: 11/872,265

(22) Filed: Oct. 15, 2007

(65) Prior Publication Data
US 2009/0095342 A1    Apr. 16, 2009

(51) Int. Cl.
*G01J 1/20* (2006.01)
(52) U.S. Cl. ............... 250/203.4; 250/203.1; 136/246; 136/259
(58) Field of Classification Search .............. 250/203.4, 250/203.1; 136/246, 259
See application file for complete search history.

(56) References Cited

U.S. PATENT DOCUMENTS

| | | | | |
|---|---|---|---|---|
| 4,419,981 A * | 12/1983 | Mori | ....................... | 250/203.4 |
| 4,942,292 A * | 7/1990 | Ichimura et al. | ......... | 250/203.4 |
| 6,617,506 B2 * | 9/2003 | Sasaki | ...................... | 250/203.4 |
| 6,636,977 B1 * | 10/2003 | Chen | .......................... | 713/340 |
| 2003/0062243 A1 * | 4/2003 | Mattice | ....................... | 194/328 |
| 2006/0042177 A1 * | 3/2006 | Lin et al. | .................. | 52/167.1 |

\* cited by examiner

*Primary Examiner*—Seung C Sohn
(74) *Attorney, Agent, or Firm*—WPAT, P.C.; Anthony King

(57) ABSTRACT

A solar-tracking power generating apparatus includes a plurality of sensing units having a directional light-extraction member each, a plurality of solar batteries associated with a light-gathering device each, and a solar trajectory simulation unit. Therefore, the solar-tracking power generating apparatus enables more accurate tracking of solar position and focusing of more sunlight on the solar batteries, so that the solar batteries could absorb more sunlight and convert the same into an increased amount of electric power.

13 Claims, 4 Drawing Sheets

SUN-TRACKING POWER GENERATING APPARATUS

FIELD OF THE INVENTION

The present invention relates to a solar-tracking power generating apparatus, and more particularly to a solar-tracking power generating apparatus that includes a plurality of sensing units and solar batteries with improved light-extraction ability, and a solar trajectory simulation unit.

BACKGROUND OF THE INVENTION

Considering the threatening depletion of petrochemical fuels available on the earth, other types of energy sources, such as solar power generation, wind power generation, and water power generation, have been positively exploited by people to replace the petrochemical fuels. In the case of solar power generation, there is included a solar collector panel, which is oriented to the sun for one or more solar batteries to absorb sunlight and convert the same into electric energy. For the solar collector panel to always face toward the sun, a solar-tracking apparatus is additionally mounted to the solar collector panel. A conventional solar-tracking apparatus mainly uses photosensitive resistors to track sunlight. However, the photosensitive resistors have relatively large sensing error, and the conventional solar-tracking apparatus fails to distinguish the sunlight from other light sources and detect the solar position at dawn.

It is therefore important and tried by the inventor to develop a solar-tracking power generating apparatus that enables more accurate tracking of solar position and focusing of more sunlight on solar batteries, so that the solar batteries could absorb more sunlight and convert the same into increased amount of electric power.

SUMMARY OF THE INVENTION

A primary object of the present invention is to provide a solar-tracking power generating apparatus that includes a plurality of sensing units and solar batteries with improved light-extraction ability and a solar trajectory simulation unit to thereby enable high accuracy in light extraction by the sensing units, and accordingly, more accurate tracking of solar position and focusing of more sunlight on the solar batteries, so that the solar batteries could absorb more sunlight and convert the same into increased amount of electric power.

To achieve the above and other objects, the solar-tracking power generating apparatus according to the present invention includes a solar-tracking unit, a transmission unit, and a control unit. The solar-tracking unit includes a disc being provided on an upper side with an even number of at least two pairs of sensing units and a plurality of solar batteries. The two sensing units in each pair are located in a straight line to be diametrically opposite to each other, such that all the straight lines containing the pairs of sensing units intersect with one another at a center of the disc to equally divide the 360-degree central angle of the disc, and the two sensing units in each pair are equally distant from the center of the disc. Moreover, each of the sensing units includes a solar battery sensor or a photosensitive diode sensor. The transmission unit is connected at an upper end to a lower side of the disc and at a lower end to a base. The control unit receives via a sunlight sensing circuit a signal produced by the solar-tracking unit, and controls the transmission unit via a transmission unit circuit to thereby change a solar-tracking angle of the solar-tracking unit.

With the above arrangements, the solar-tracking power generating apparatus could more accurately track the solar position and focus more sunlight on the solar batteries, so that the solar batteries could absorb more sunlight and convert the same into increased amount of electric power.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
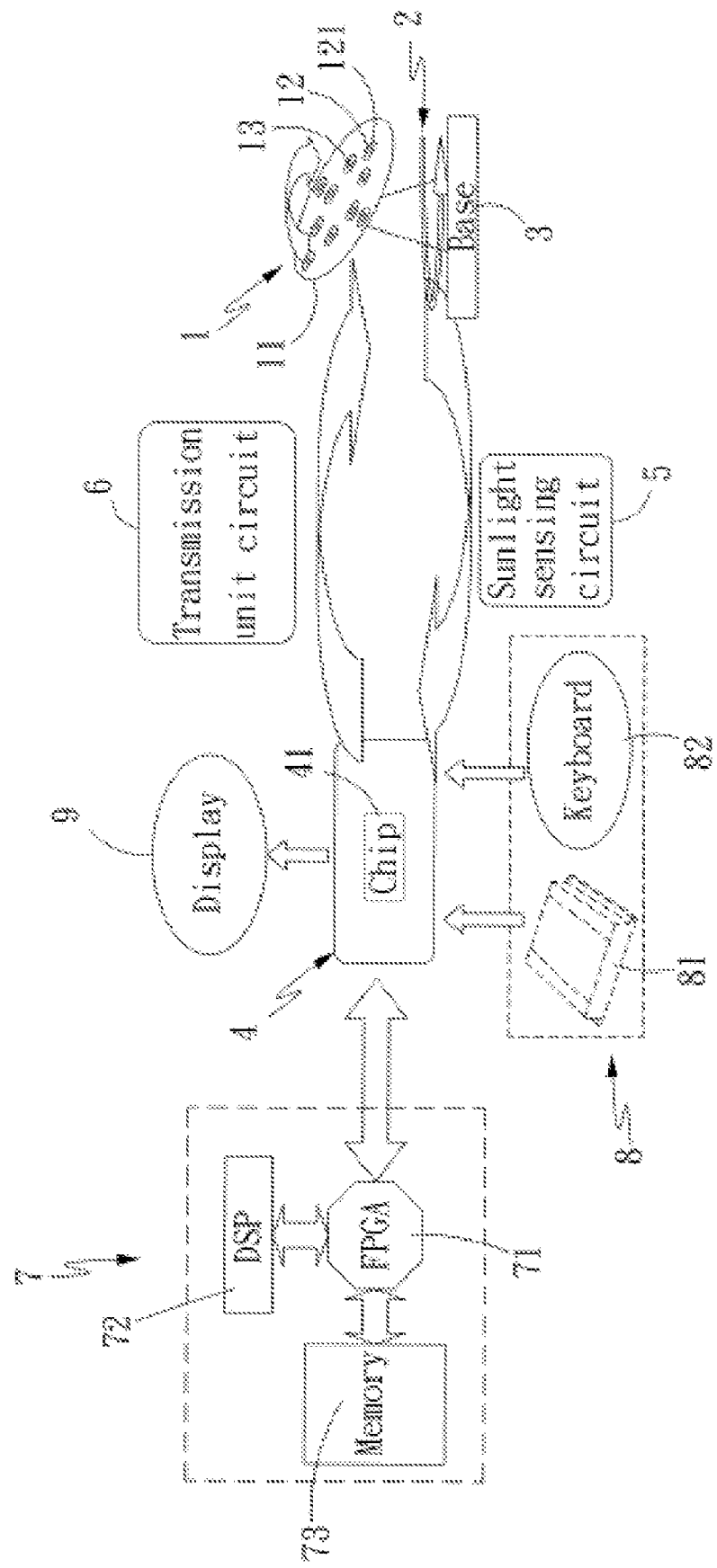
FIG. 1 is a conceptual view of a sun-tracking power generating apparatus according to a preferred embodiment of the present invention.

Please refer to FIG. 1 that is a conceptual view of a sun-tracking power generating apparatus according to a preferred embodiment of the present invention. As shown, the sun-tracking power generating apparatus of the present invention includes a sun-tracking unit 1, a transmission unit 2, a control unit 4, a solar trajectory simulation unit 7, and an input unit 8.

The solar-tracking unit 1 includes a disc 11 being provided on an upper side with two pairs of sensing units 12 and a plurality of solar batteries 13. The two sensing units 12 in each pair are diametrically opposite to each other, such that two straight lines containing the two pairs of sensing units 12 perpendicularly intersect with each other at a center of the disc 11 to equally divide the 360-degree central angle of the disc 11, and the two sensing units 12 in each pair are equally distant from the center of the disc 11. Each of the sensing units 12 includes a solar battery sensor (or a photosensitive diode sensor) 121. The use of a solar battery as a sensor advantageously saves a lot of power cost.

The transmission unit 2 is connected at an upper end to a lower side of the disc 11 and at a lower end to a base 3.

The control unit 4 includes an 89C51 chip 41, which is a control chip for receiving via a sunlight sensing circuit 5 a signal produced by the solar-tracking unit 1, and controlling the transmission unit 2 via a transmission unit circuit 6 to thereby change a solar-tracking angle of the solar-tracking unit 1.

The solar trajectory simulation unit 7 includes a field programmable gate array (FPGA) 71, a digital signal processor (DSP) 72, and a memory 73. The FPGA 71 is electrically connected to the 89C51 chip 41 while the DSP 72 and the memory 73 are electrically connected to the FPGA 71 to simulate solar trajectories.

The input unit 8 includes a global positioning system (GPS) 81 or a keyboard 82. A current position of the solar-tracking power generating apparatus is input at the GPS 81/keyboard 82 and sent to the 89C51 chip 41, and the input data is shown on a display 9 electrically connected to the 89C51 chip 41.

When the solar-tracking power generating apparatus of the present invention is enabled, solar energy absorbed by each of two solar battery sensors (or two photosensitive diode sensors) 121 in a first pair of sensing units 12 oriented to a first direction is converted into voltage (or current) signals. The voltage (or current) signals are sent to the 89C51 chip 41 via the sunlight sensing circuit 5. When the 89C51 chip 41 determines the voltage (or current) signals from the two solar battery sensors (or a photosensitive diode sensors) 121 in the first pair of sensing units 12 are different from each other, the 89C51 chip 41 will control the transmission unit 2 via the transmission unit circuit 6, so as to change the solar-tracking angle of the solar-tracking unit 1 in the first direction until the voltage (or current) signals from the two solar battery sensors (or a photosensitive diode sensors) 121 in the first pair are the same. The solar-tracking angle of the solar-tracking unit 1 in a second direction perpendicular to the first direction is adjusted in the same principle and procedures as that for adjusting the solar-tracking angle in the first direction, so that the solar-tracking unit 1 is finally accurately oriented toward the sun, enabling the solar batteries 13 to absorb the largest possible amount of sunlight.

The solar trajectory simulation unit 7 is mainly used to assist the solar-tracking power generating apparatus in tracking solar trajectories. When the current position of the solar-tracking power generating apparatus is input at the GPS 81/keyboard 82 and sent to the 89C51 chip 41, the 89C51 chip 41 further sends the position data to the memory 73 of the solar trajectory simulation unit 7. The FPGA 71 will then conduct logic operation according to the position data stored on the memory 73. Meanwhile, the DSP 72 will assist in and speed up the operation conducted by the FPGA 71. Solar trajectories obtained from the logic operation are sent back to the 89C51 chip 41 to assist in the adjustment of the solar-tracking angle of the solar-tracking unit 1. At dawn before the sun appears, the solar trajectory simulation unit 7 may predict the position at where the sun first appears, so that the solar-tracking unit 1 may be adjusted in advance to that position and prepared for subsequent solar tracking. Moreover, when there is any other light source during the course of solar tracking by the solar-tracking power generating apparatus, the solar trajectory simulation unit 7 may also function to assist the solar-tracking power generating apparatus in tracking correct sunlight.

Figure 2:
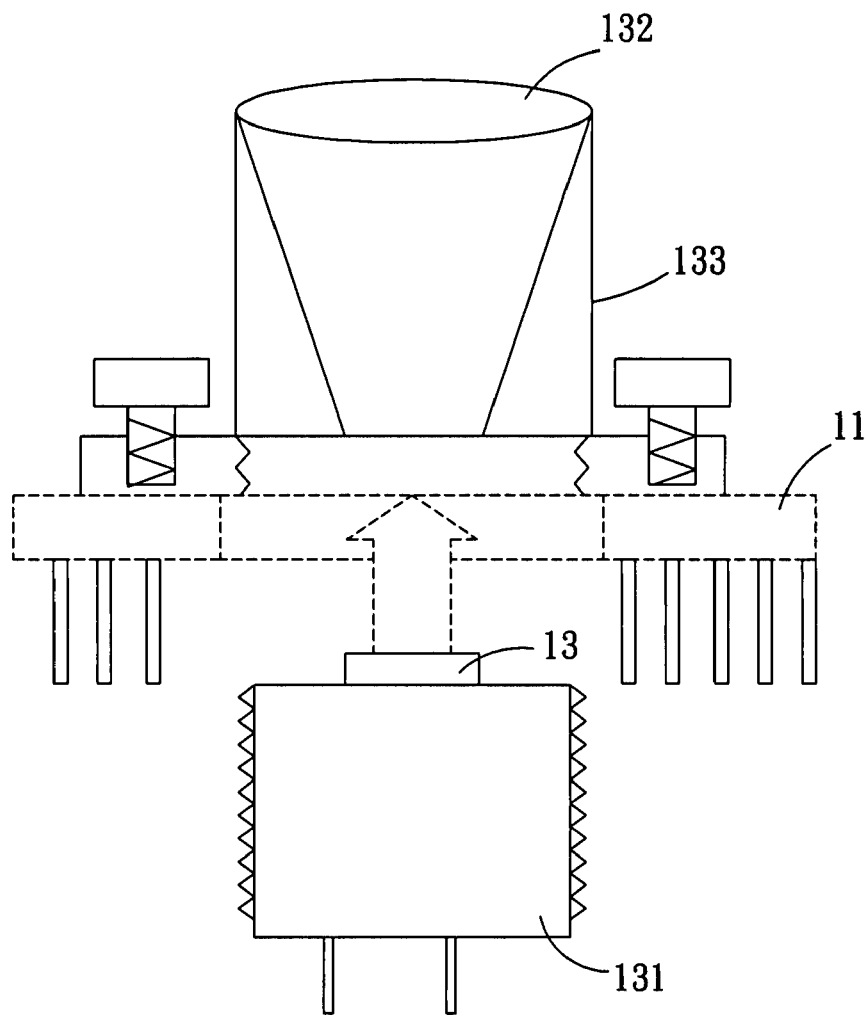
FIG. 2 schematically shows a light-gathering device adopted in the preferred embodiment of the present invention.

FIG. 2 schematically shows a light-gathering device adopted in the preferred embodiment of the present invention. As shown, each of the solar batteries 13 is further provided with a light-gathering lens 132, a cylindrical member 133, and an externally threaded rotatable seat 131. The solar battery 13, the rotatable seat 131, the light-gathering lens 132, and the cylindrical member 133 together constitute a light-gathering device for the present invention. The rotatable seat 131 is made of an aluminum material for upward screwing to the disc 11, which is also made of an aluminum material, and the solar battery 13 is mounted on the rotatable seat 131. The cylindrical member 133 has a lower end connected to the upper side of the disc 11 to enclose the solar battery 13 on the rotatable seat 131, and an upper end having the light-gathering lens 132 mounted thereto. By screwing the externally threaded rotatable seat 131 into the disc 11 by different depths, the solar battery 13 mounted thereon may be adjusted to an optimal height for gathering light, so as to achieve the best power generation efficiency.

Figure 3:
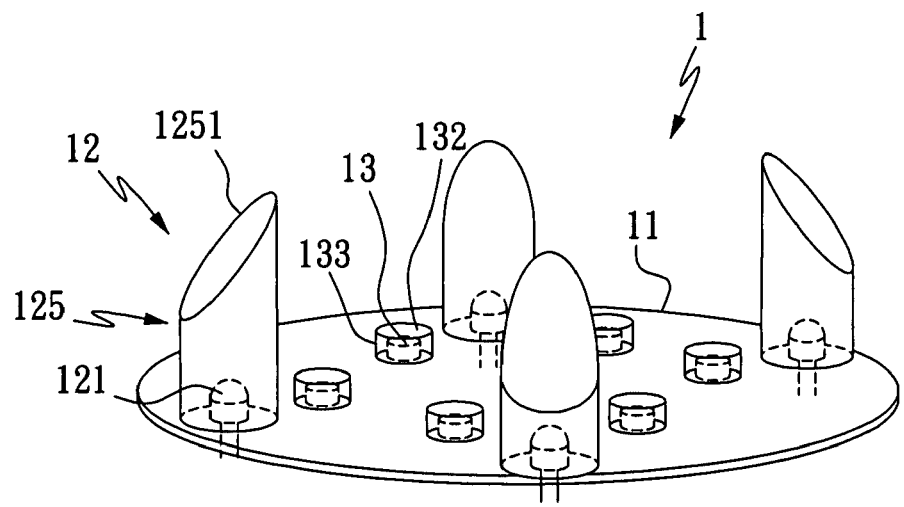
FIG. 3 schematically shows a plurality of sensing units and light-gathering devices adopted in the preferred embodiment of the present invention.

FIG. 3 schematically shows the sensing units 12 and the light-gathering devices adopted in the preferred embodiment of the present invention. As shown, each of the sensing units 12 includes, in addition to the solar battery sensor (or the photosensitive diode sensor) 121, a directional light-extraction member 125. The light-extraction member 125 has a beveled upper open end 1251, and a lower end connected to the upper side of the disc 11 to thereby enclose the solar battery sensor (or the photosensitive diode sensor) 121 therein. It is noted the beveled upper open ends 1251 of the directional light-extraction members 125 of the two sensing units 12 in each pair are faced away from each other. When the difference between the sensed voltage (or current) signals from the solar battery sensors (or the photosensitive diode sensors) 121 of the two sensing units 12 in each pair is small, the back-to-back beveled upper open ends 1251 may advantageously amplify such small difference, or, in other words, the voltage (or current) difference between two sensing units 12 in the each pair may be more sensitively detected by the solar battery sensors (or the photosensitive diode sensors) 121, so that the solar-tracking unit 1 may be adjusted to a more accurate solar-tracking angle for the solar batteries 13 to absorb the largest possible amount of sunlight.

Figure 4:
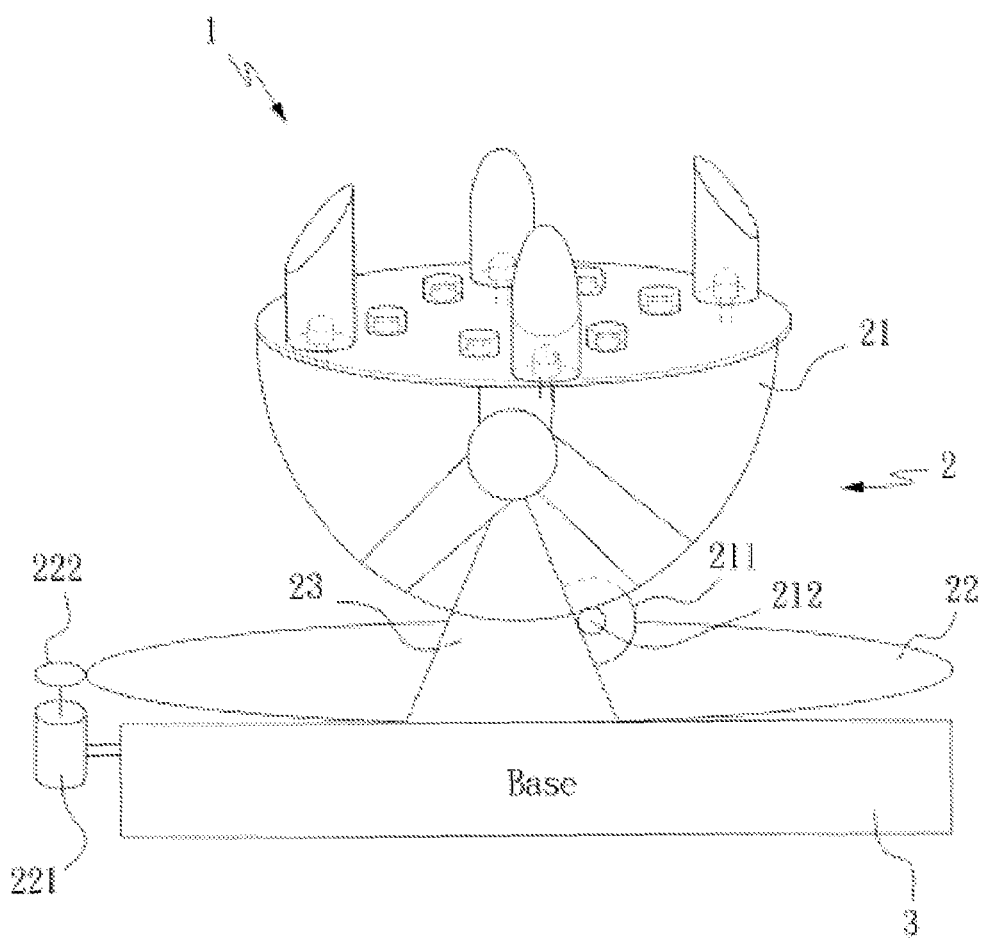
FIG. 4 schematically shows a first embodiment of a transmission unit adopted in the present invention.

FIG. 4 schematically shows a first embodiment of the transmission unit 2 adopted in the present invention. As shown, the transmission unit 2 in the first embodiment thereof includes a first step motor 211, a second step motor 221, a semicircular gear 21, a support 23, and a horizontal gear 22. The semicircular gear 21 is perpendicularly connected at its straight edge to the lower side of the disc 11. The support 23 is pivotally connected at an upper end to one side of the semicircular gear 21, and fixedly connected at a lower end to a center of the horizontal gear 22. The first step motor 211 is mounted to the support 23 to drive a first driving gear 212, so that the semicircular gear 21 is driven by the first driving gear 212 to turn and thereby change a horizontal angulation of the solar-tracking unit 1. The horizontal gear 22 is rotatably connected at its center to an upper side of the base 3, and the second step motor 221 is located at one side of the base 3 for driving a second driving gear 222 to rotate, so that the horizontal gear 22 is driven by the second driving gear 222 to rotate and thereby move the solar-tracking unit 1 to a different angle of circumference.

Figure 5:
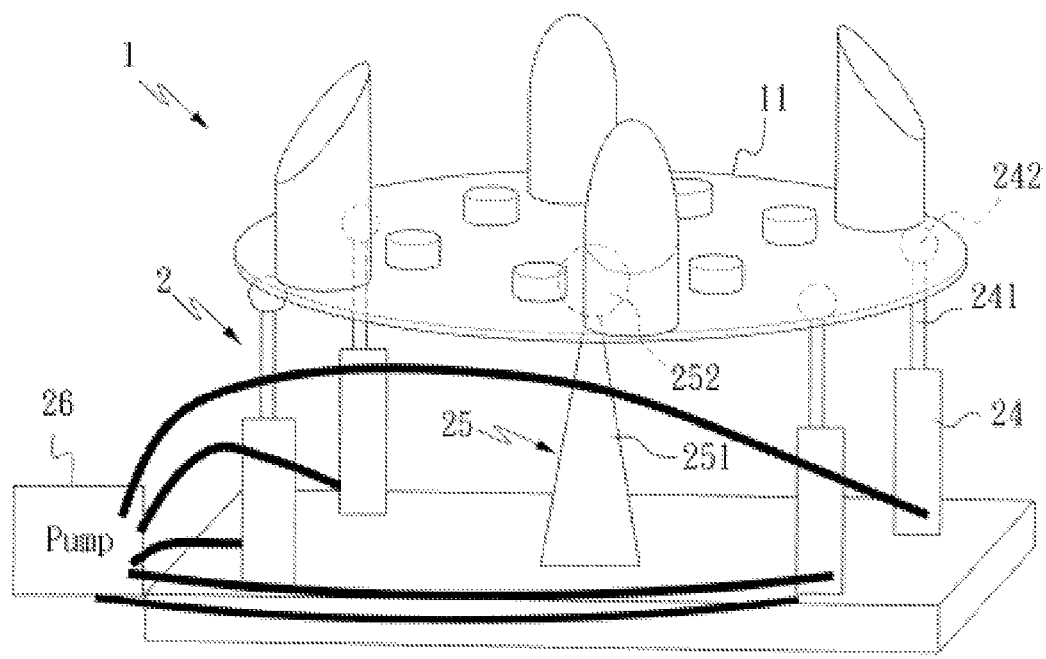
FIG. 5 schematically shows a second embodiment of the transmission unit adopted in the present invention.
Figure 6:
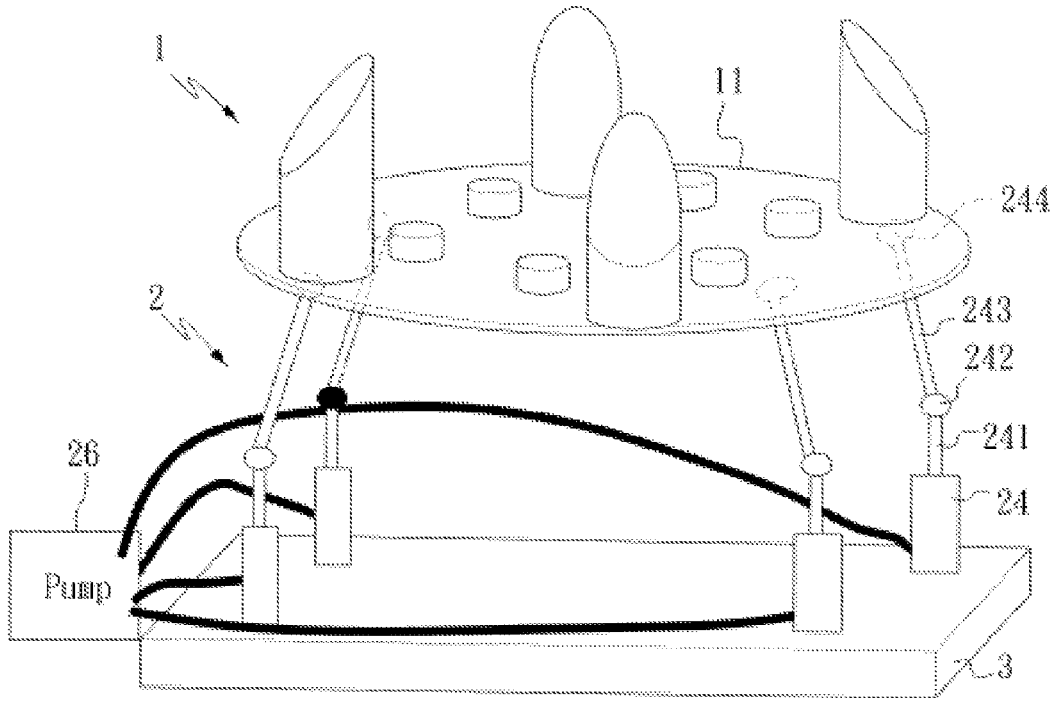
FIG. 6 schematically shows a third embodiment of the transmission unit adopted in the present invention.

FIG. 5 schematically shows a second embodiment of the transmission unit 2 adopted in the present invention. As shown, the transmission unit 2 in the second embodiment thereof includes four driving cylinders 24, which may be oil cylinders or air cylinders, and are driven by a pump 26 to work. The four driving cylinders 24 are mounted on the base 3 to equally bear an overall weight of the solar-tracking unit 1. Each of the four driving cylinders 24 includes an extension rod 241 and a first universal joint 242. The extension rod 241 has a lower end extendably received in the driving cylinder 24. The universal joint 242 interconnects the lower side of the disc 11 and an upper end of the extension rod 241. When the extension rods 241 are extended from or retracted into the driving cylinders 24 by different distances, the solar-tracking unit 1 may be adjusted to a different solar-tracking angle. The transmission unit 2 in the second embodiment thereof may further include a support 25 mounted on the base 3 to support the solar-tracking unit 1 at the center thereof, so as to bear the weight of the solar-tracking unit 1 along with the driving cylinders 24. The support 25 includes a supporting column 251 being connected at a lower end to the base 3, and a universal joint 252 interconnecting the lower side of the disc 11 and an upper end of the supporting column 251.

FIG. 5 schematically shows a third embodiment of the transmission unit 2 adopted in the present invention. As shown, the transmission unit 2 in the third embodiment thereof includes four driving cylinders 24, which may be oil cylinders or air cylinders, and are driven by a pump 26 to work. The four driving cylinders 24 are mounted on the base 3 to equally bear an overall weight of the solar-tracking unit 1. Each of the four driving cylinders 24 includes an extension rod 241, a first universal joint 242, a link 243, and a second universal joint 244. The extension rod 241 has a lower end extendably received in the driving cylinder 24. The first universal joint 242 interconnects an upper end of the extension rod 241 and a lower end of the link 242, and the second universal joint 244 interconnects the lower side of the disc 11 and an upper end of the link 243. By extending or retracting the extension rods 241 from or into the driving cylinders 24 by different distances, and adjusting the links 243 to different angular positions, the solar-tracking unit 1 may be adjusted to different solar-tracking angles within a widened range.

The solar-tracking power generating apparatus of the present invention is novel and improved because it includes a plurality of sensing units with improved light-extraction ability and a solar trajectory simulation unit to enable high accuracy in light extraction by the sensing units 12, and accordingly, more accurate tracking of solar position and focusing of more sunlight on the solar batteries 13, so that the solar batteries 13 could absorb more sunlight and convert the same into increased amount of electric power. Therefore, the solar-tracking power generating apparatus of the present invention is industrially valuable and practical for use to fully meet current market demands.

The present invention has been described with some preferred embodiments thereof and it is understood these preferred exemplary embodiments are not intended to limit the scope, applicability, or configuration of the invention, and that many changes and modifications in the described embodiments can be carried out without departing from the scope and the spirit of the invention that is intended to be limited only by the appended claims.

What is claimed is:

1. A solar-tracking power generating apparatus, comprising:
a solar-tracking unit including a disc being provided on an upper side with an even number of at least two pairs of sensing units and a plurality of solar batteries; the two sensing units in each pair are located in a straight line to be diametrically opposite to each other, such that all the straight lines containing the pairs of sensing units intersect with one another at a center of the disc to equally divide a 360-degree central angle of the disc, and the two sensing units in each pair are equally distant from the center of the disc; and each of the sensing units including a solar battery sensor or a photosensitive diode sensor;
a transmission unit being connected at an upper end to a lower side of the disc and at a lower end to a base;
a control unit for receiving via a sunlight sensing circuit a signal produced by the solar-tracking unit, and controlling the transmission unit via a transmission unit circuit to change a solar-tracking angle of the solar-tracking unit; and
wherein the control unit further comprises an 89C51 chip for receiving a signal produced by the solar-tracking unit via the sunlight sensing circuit and controlling the transmission unit via the transmission unit circuit to change the solar-tracking angle of the solar-tracking unit.

2. The solar-tracking power generating apparatus as claimed in claim 1, wherein each of the solar batteries is further provided with a light-gathering lens, a cylindrical member, and a rotatable seat; the rotatable seat being upward screwed to the disc, and the solar battery being mounted on the rotatable seat; and the cylindrical member having a lower end connected to the upper side of the disc to enclose the solar battery on the rotatable seat, and an upper end having the light-gathering lens mounted thereto.

3. The solar-tracking power generating apparatus as claimed in claim 1, wherein each of the sensing units further includes a directional light-extraction member; the light-extraction member having a beveled upper open end, and a lower end connected to the upper side of the disc to thereby enclose the solar battery sensor or the photosensitive diode sensor therein; and the beveled upper open ends of the directional light-extraction members of the two sensing units in each pair being faced away from each other.

4. The solar-tracking power generating apparatus as claimed in claim 1, wherein the transmission unit includes a first step motor, a second step motor, a semicircular gear, a support, and a horizontal gear; the semicircular gear being perpendicularly connected at its straight edge to the lower side of the disc; the support being pivotally connected at an upper end to one side of the semicircular gear, and fixedly connected at a lower end to a center of the horizontal gear; the first step motor being mounted to the support to drive a first driving gear, so that the semicircular gear is driven by the first driving gear to turn and thereby change a horizontal angulation of the solar-tracking unit; the horizontal gear being rotatably connected at its center to an upper side of the base, and the second step motor being located at one side of the base for driving a second driving gear to rotate, so that the horizontal gear is driven by the second driving gear to rotate and thereby move the solar-tracking unit to a different angle of circumference.

5. The solar-tracking power generating apparatus as claimed in claim 1, wherein the transmission unit includes an even number of at least four driving cylinders mounted on the base to equally bear an overall weight of the solar-tracking unit; and each of the driving cylinders including an extension rod having a lower end extendably received in the driving cylinder and a first universal joint interconnecting the lower side of the disc and an upper end of the extension rod.

6. The solar-tracking power generating apparatus as claimed in claim 1, wherein the transmission unit includes an even number of at least four driving cylinders mounted on the base to equally bear an overall weight of the solar-tracking unit; and each of the driving cylinders including an extension rod, a link, a first universal joint, and a second universal joint; the extension rod having a lower end extendably received in the driving cylinder, the first universal joint interconnecting an upper end of the extension rod and a lower end of the link, and the second universal joint interconnecting the lower side of the disc and an upper end of the link.

7. The solar-tracking power generating apparatus as claimed in claim 5, wherein the transmission unit further includes a support mounted on the base to support the solar-tracking unit at the center thereof, so that the support and the driving cylinders together bear the weight of the solar-tracking unit; and the support including a supporting column connected at a lower end to the base, and a universal joint interconnecting the lower side of the disc and an upper end of the supporting column.

8. The solar-tracking power generating apparatus as claimed in claim 5, wherein the driving cylinders are selected from the group consisting of oil cylinders and air cylinders.

9. The solar-tracking power generating apparatus as claimed in claim 6, wherein the driving cylinders are selected from the group consisting of oil cylinders and air cylinders.

10. The solar-tracking power generating apparatus as claimed in claim 1, further comprising a solar trajectory simulation unit electrically connected to the 89C51 chip for simulating solar trajectories.

11. The solar-tracking power generating apparatus as claimed in claim 10, wherein the solar trajectory simulation unit includes a field programmable gate array (FPGA), a digital signal processor (DSP), and a memory; and the FPGA being electrically connected to the 89C51 chip, while the DSP and the memory being electrically connected to the FPGA.

12. The solar-tracking power generating apparatus as claimed in claim 11, further comprising an input unit; the input unit being selected from the group consisting of a global positioning system (GPS) or a keyboard; a current position of the solar-tracking power generating apparatus being input at the GPS/keyboard and sent to the 89C51 chip.

13. The solar-tracking power generating apparatus as claimed in claim 12, further comprising a display electrically connected to the 89C51 chip for showing data input via the GPS/keyboard.

* * * * *